United States Patent [19]

Coirre et al.

[11] 3,891,765
[45] June 24, 1975

[54] ANTI-INFLAMMATORY AND ANALGESIC L-HYDROXYPROLINE DERIVATIVES

[75] Inventors: Paul Coirre; Bertrand Coirre, both of Ville d'Avray; Jean-Claude Denis; Jerome Rambaud, Jean Cahn, all of Paris, all of France

[73] Assignee: Franco Chimie S.a.r.l., Paris, France

[22] Filed: Apr. 12, 1972

[21] Appl. No.: 243,397

Related U.S. Application Data

[63] Continuation-in-part of Ser. No. 81,499, Oct. 16, 1970, abandoned, which is a continuation-in-part of Ser. No. 756,410, Aug. 20, 1968, abandoned.

[30] Foreign Application Priority Data

Sept. 14, 1967 France.................... 67.121020
May 16, 1968 France.................... 68.152048

[52] U.S. Cl. .............................................. 424/274
[51] Int. Cl. ............................................ A61k 27/00
[58] Field of Search ................................... 424/274

[56] References Cited
OTHER PUBLICATIONS

Chemical Abstracts 53:4259d–4260e (1959).
Chemical Abstracts 58:3773a (1963).
Chemical Abstracts 58:3765h (1963).
J.A.C.S. 79 pp. 185–192, 1957 (Patchett et al.).

Primary Examiner—Albert T. Meyers
Assistant Examiner—Leonard Schenkman
Attorney, Agent, or Firm—William J. Stein; Eugene O. Retter; George W. Rauchfuss, Jr.

[57] ABSTRACT

This invention is concerned with new therapeutical derivatives of L-hydroxyproline of the formula:

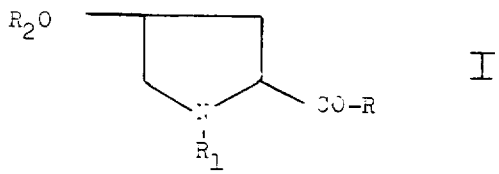

in which R represents OH, $NH_2$, ONa, m-trifluoromethylanilido or p-trifluoromethylanilido; $R_1$ represents —$COCH_3$, 7-theophyllinyl-acetyl, p-isobutylphenylacetyl or 2,4-dinitrophenyl, and $R_2$ represents H, or p-isobutyl phenyl acetyl, excluding N-acetyl-1-hydroxyproline and N-acetyl-1-hydroxyprolinamide. These compounds are useful as analgesic agents and in the treatment of inflammation.

4 Claims, No Drawings

ANTI-INFLAMMATORY AND ANALGESIC L-HYDROXYPROLINE DERIVATIVES

This is a continuation-in-part of our copending application Ser. No. 81,499 filed on Oct. 16, 1970, now abandoned which in turn is a continuation-in-part of U.S. application Ser. No. 756,410, filed Aug. 30, 1968 and now abandoned.

BACKGROUND OF THE INVENTION

This invention relates to medicaments capable of acting on the metabolism of the conjunctive tissue in the assembly of an organism, more particularly in the field of the articulations, the cardio-vascular system and the skin. In our co-pending application Ser. No. 81,499 filed Oct. 16, 1970, now abandoned, there are described derivatives of L-hydroxyproline of the formula:

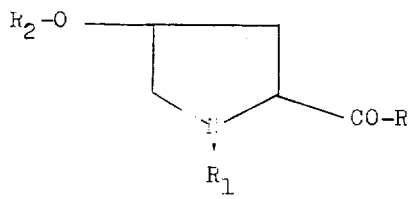

wherein $R_1$ = H or $COCH_3$; $R_2$ = H or $COCH_3$; = OH, or $NH_2$, or

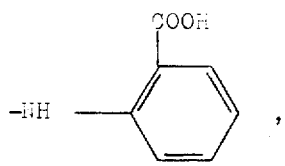

with $R_1$ = $COOH_3$ and $R_2$ = H and corresponding hydrochlorides excluding the following compounds: 1-hydroxyproline and its hydrochloride, N-acetyl-1-hydroxyproline, 0-acetyl-1-hydroxyproline and its hydrochloride and 1-hydroxyprolinamide and its hydrochloride; which are useful as anti-inflammatory agents.

SUMMARY OF THE INVENTION

The present application provides derivatives of L-hydroxyproline of the formula:

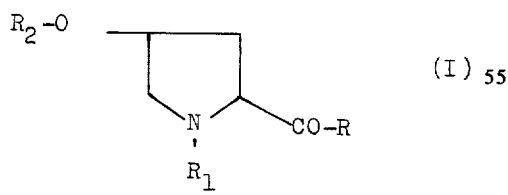

(I)

in which R represents OH, $NH_2$, ONa, m-trifluoromethylanilido or p-trifluoromethylanilido; $R_1$ represents — $COCH_3$, 7-theophyllinyl acetyl, p-isobutyl phenyl acetyl or 2,4-dinitrophenyl; and $R_2$ represents a hydrogen atom or a p-isobutyl phenyl acetyl group, exlcuding N-acety-1 - hydroxyproline, and N-actyl-1-hydroxyprolinamide.

DESCRIPTION OF THE PREFERRED EMBODIMENTS

The compounds of the present invention are prepared by condensing a compound of formula

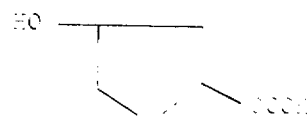

with a halide Hal $R_1$ where Hal represents an atom of halogen and $R_1$ is defined as above, at a temperature between 0° and 25°C, and if desired the OH is esterified, and/or the COOH is esterified or transformed to sodium salt or the amide derivative.

The acetylization at the nitrogen is effected by reaction with acetic anhydride in an acetic acid medium at the boiling point of the mixture. When the substitution on the nitrogen atom is effected with the chlorides of 7-theophyllinyl acetic acid, or p- or m-isobutyl phenyl acetic acid, the reaction takes place at low temperatures in the presence of an organic base such as pyridine, triethyl amine.

The products obtained after this actylation at the nitrogen with acetic anhydride or substituted acetic acid chlorides are capable of being transformed into 2carboxamide derivatives by the usual methods or they may also be converted into the sodium salt in the 2 position if desired.

Acetylation at the oxygen atom situated in position 4 by the chloride of p-isobutyl phenyl acetic acid may be effected at a low temperature in the presence of pyridine, the reaction being carried out on a compound of formula I already acetylated at the nitrogen.

The preferred products according to the invention are selected from the group consisting of N-(2,4-dinitrophenyl)-4-hydroxy-L-proline, N-(7-theophyllineacetyl)-4-hydroxyl-L-proline:

N-acetyl-4-hydroxy-L-proline (m-trifluoromethyl anilide):

N-acetyl-4-hydroxy-L-proline (p-trifluoromethyl-anilide):

N-acetyl-0-(4-isobutyl-phenyl-acetyl)-L-hydroxyproline:

N-(p-isobutyl-phenyl-acetyl)-4-hydroxy-L-proline):

The following examples are given to illustrate the method in accordance with the invention.

EXAMPLE 1

N-(2,4-dinitrophenyl)-4-hydroxy-L-proline 13.6 g of 2,4-dinitrofluorobenzene are added drop by drop to 13.1 g of L-hydroxyproline dissolved in 200 cc of 0.5 N methanolic sodium hydroxide, at ambient temperature (15°–25°C). A further 200 cc of 0.5 N methanolic sodium hydroxide are then added during the course of half an hour. After stirring for a further half hour the product is left for one night at ambient temperature. The methanol is evaporated, brought up to the previous volume, with water, acidified with hydrochloric acid and extracted with ethyl acetate. After drying and evaporating the dinitrophenol derivative, crystallization is effected by the addition of ether.

13.1 g of the product are obtained.

Melting point = 169°–174°C (with decomposition).
($\alpha$)$_D$ = 1062
Titer in acid: 99.6%
The code number of this product is PC. 69–13.
The product has a formula:

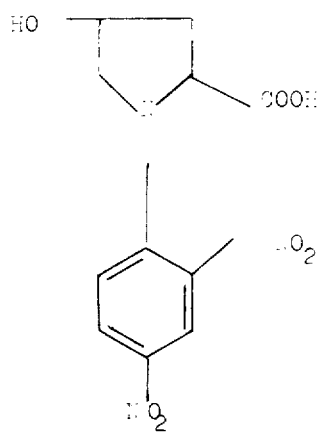

EXAMPLE 2

N-(theophylline acetyl)-4-hydroxyl-L-proline sodium salt:

19.55 g of the hydrochloride of the methyl ester of L-hydroxyproline is dissolved in 400 cc of chloroform containing 28 cc of triethyl amine, the mixture is cooled to 0°C. 25.65 g of theophylline acetyl chloride are introduced over a period of 10 minutes; the mixture is stirred for 30 minutes at 0°C and then left for 1 hour at ambient temperature. Evaporation is effected under a vacuum, and triethyl amine hydrochloride is precipitated by acetone and then dried.

The acetone is evaporated and the residue heated to reflux in 200 cc of methanol containing 4 g of sodium hydroxide.

After half an hours of reflux the salt begins to precipitate; heating is continued for a further 45 minutes. The product is cooled, dried, and rinsed with methanol.

20 g of product are obtained.
Melting point: above 170°C.
Sodium titer : 202 %
($\alpha$)$_D$ = –100.
The code number of this product is PC. 69-5.
The product has a formula:

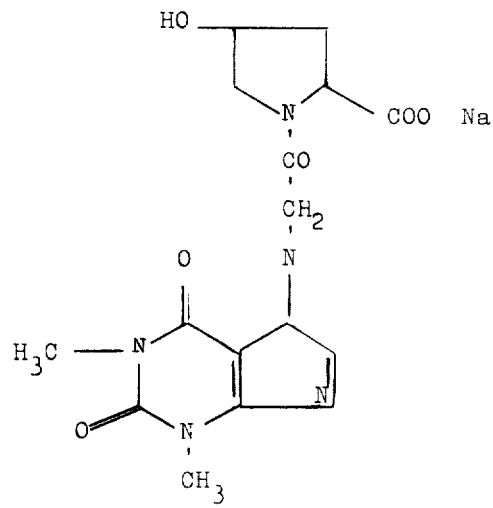

EXAMPLE 3

N-acetyl-4-hydroxy-L-proline(m-trifluoromethyl anilide):

A solution of 400 mg of sodium nitrite in water is added slowly to a solution of N-acetyl-4-hydroxy-L-proline hydrazide (1 g) in 10 cc of acetic acid (10% by volume) in water at 0°–2°C, and the product stirred for 20 minutes at 0°–5°C. A solution of 2 cc of m-trifluoromethyl aniline in 2 cc of pyridine is then added and stirring continued for 30 minutes at 0°–5°C, then 2 hours at 20°C.

The product is then acidified with 3N hydrochloric acid, allowed to stand for some hours, dried and crystallized with methanol -methylene chloride (Me—OH CH$_2$—CL$_2$).

1 g of product is obtained.
Melting point = 205°–210°C.
($\alpha$)$_D$ = 46.7 in 1% ethyl alcohol.
The code number of this product is PC. 68-9.
The product has the formula:

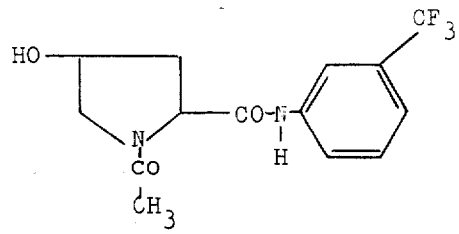

EXAMPLE 4

N-acetyl-4-hydroxy-L-proline (p-trifluoromethylanilide):

A solution of 400 mg of sodium nitrite in 2 cc of water is added slowly to a solution of 1 g of N-acetyl-4-hydroxy-L-proline hydrazide in 10 cc of 10% acetic acid in water at 0°–2°C, the mixture is stirred for 20 minutes at 5°C, after which a solution of 2 cc of p-trifluoromethyl aniline in 2 cc pyridine is added and stirring continued for 30 minutes at 0°–5°C, and then for 2 hours at 20°C.

The product is then acidified with 3N hydrochloric acid, allowed to stand for some hours, dried and crystallized with methanol-methylene chloride (MeOH—CH$_2$—Cl$_2$).

1 g of product is obtained.
Melting point = 252°C.
($\alpha$)$_D$ = –43 in ethyl alcohol.
The code number of this product is PC. 69-3.
The product has the formula:

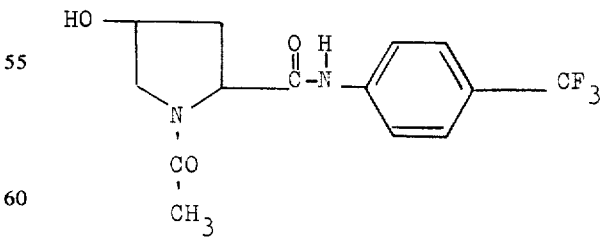

EXAMPLE 5

N-acetyl-O-(4-isobutyl-phenyl-acetyl)-L-hydroxyproline:

200 cc of p-isobutyl-phenyl-acetyl chloride in 500 cc of CH Cl$_3$ are added to 173 g of N-acetyl-L- hydroxyproline in 600 cc of pyridine cooled to 0°C, in the course of half an hour, then the mixture is stirred for a further 30 minutes at 0°C, after which the product is allowed to stand for 24 hours in a refrigerator.

After having been poured into the ice it is acidified till a pH of 2–3 is reached, using hydrochloric acid. The product is decanted, then extracted again with CH Cl₃ (3 × 200 cc), the chloroformic phase is washed with water, and the product dried and evaporated. The product is crystallized by the addition of hexane, and 120 g of the product are obtained.

Melting point = 110°–113°C.
Acid titer = 103%
$(\alpha)_D = -31$ in ethyl alcohol.
The code number of this product is PC. 69-7.
The product has the formula:

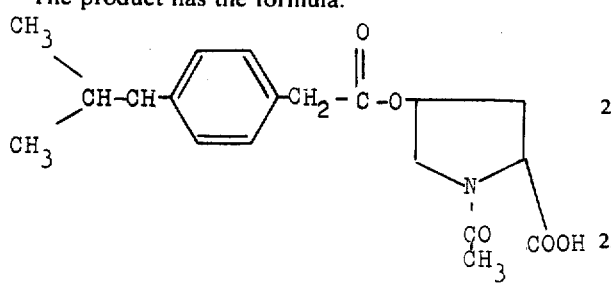

EXAMPLE 6

N-(p-isobutyl-phenyl-acetyl)-4-hydroxy-L-proline):

13.1 g of L-hydroxyproline are dissolved in 50 cc of water containing 4 g of sodium hydroxide at ambient temperature. 13 cc of the acid chloride is added fairly quickly, and then a further 50 cc of water containing 4 g of sodium hydroxide. The product is stirred until dissolution is complete, and allowed to stand for 1 hour, and is then acidified with 10% hydrochloric acid. The product is allowed to stand and is then dried.

The solid product is dissolved in CH₂Cl₂, dried over Na₂SO₄ and concentrated, after which crystallization is carried out by adding hexane.

16.2 g of the product are obtained.
Melting point = 130°–132°C.
$(\alpha)_D = -46°$ in ethanol.
The code number of this product is PC. 69-8.
The product has the formula:

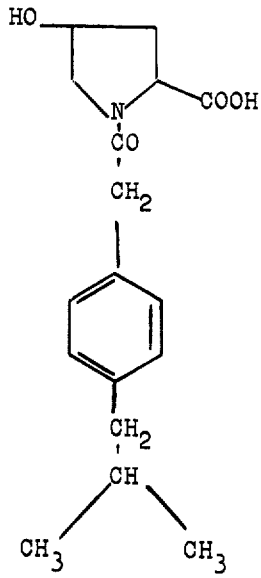

PHARMACOLOGICAL PROPERTIES

Compounds prepared in accordance with the method of the invention have anti-inflammation properties, and are best described by taking for example PC. 68-9, or N-acetyl-4-hydroxy-L-proline (m-trifluoromethyl anilide).

The usual tests on animals were employed to demonstrate anti-inflammation properties and in particular the RANDALL and SELITTO test and the turpentine micro-abscess test.

1. In the RANDALL and SELITTO test inflammation is obtained by the injection under the plantar aponevrosis, of a 20% aqueous suspension of brewer's yeast. A force is applied on the plantar surface which is gradually increasing by 16 g per second, and the threshold of pain is determined by the force necessary to initiate a characteristic withdrawal of the animal's paw.

The action of the PC. 68-9 is early and obvious in this test, the force required to initiate the withdrawal of the paw being almost double that in the case of the control animals. This action appeared as from the 30th minute.

The turpentine micro-abscess test technique is described in British Pat. No. 1,246,141. In this test the compounds forming the subject matter of this invention, and particularly PC. 68-9, exert a powerful action as from the 30 mg/kg dose. This action is associated with the reduction of reticulo-histiocytes, collagen fibres, fibroblasts and even the number of neovessels.

Furthermore the compounds of this series exhibit an analgesic activity in the test with 2-phenyl-1-4-benzoquinone in intraperitoneal injection.

To sum up, the pharmacological action of the derivatives of hydroxyproline forming the subject matter of this application consists of anti-inflammation action and an analgesic action.

It should also be noted a special activity of PC. 69-5 or the sodium salt of N-(theophylline acetyl)-4-hydroxy-L-proline, which is a very powerful cough cure (ammonia vapour test).

The products described above have been used on human beings in various ways suggested by the pharmacological data given, that is to say essentially the cases of rheumatism. Investigation on human beings confirm the results obtained with animals, demonstrating the activity of this range of products in various types of acute or chronic inflammatory rheumatism.

The various compounds forming the subject matter of this application have to be administered to human beings in doses each containing 0.100 g or 0.200 g of active product, in 3 to 8 doses a day, in any pharmaceutical form, preferably orally in the form of tablets or gelatin-coated pills.

EXAMPLES of pharmaceutical preparations

N-acetyl-4-hydroxy-L-proline (m-trifluoromethyl anilide)
(PC. 68–9)                                         0.200 g
Excipient quantity sufficient for 1 tablet.
3–6 tablets per day in the treatment of inflammatory rheumatic cases.

N-acetyl-O-(4-isobutyl-phenyl acetyl)-L-hydroxyproline
(PC. 69–7)                                         0.100 g
Excipient quantity sufficient for 1 tablet
3 to 8 tablets a day in the treatment of rheumatic cases.

N-(theophylline acetyl)-4-hydroxy-L-proline (sodium salt)
(PC. 69–5)                                         0.100 g Excipient quantity sufficient for 1 tablet. 3 to 8 tablets per day in the treatment of inflammatory cough affections of the respiratory passages.

The productions of the present invention may be used in any conventional acceptable pharmaceutical form for administration via digestive tract or for administration parenterally.

What we claim is:

1. A pharmaceutical composition suitable for anti-inflammatory and analgesic use in dosage unit form comprising from 100 milligrams to 200 milligrams of a compound having the formula:

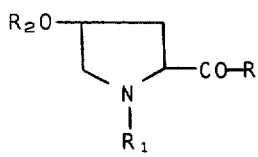

in which R is selected from the group consisting of OH, m-trifluoromethylanilido and p-trifluoromethylanilido; $R_1$ is selected from the group consisting of acetyl, p-isobutylphenylacetyl and 2,4-dinitrophenyl; $R_2$ is hydrogen or p-isobutylphenylacetyl with the proviso that when $R_1$ is acetyl and $R_2$ is hydrogen, then R cannot be OH; and a pharmaceutical carrier.

2. The composition of claim 1 in which the compound is N-acetyl-4-hydroxy-L-proline (p-trifluoromethyl anilide).

3. A method of reducing inflammation of connective tissue which comprises the oral or parenteral administration of the composition of claim 1 to animals in need thereof from three to eight times daily.

4. A method of reducing inflammation of human connective tissue which comprises the oral administration of the composition of claim 1 to humans in need thereof from three to eight times daily.

* * * * *

UNITED STATES PATENT OFFICE
CERTIFICATE OF CORRECTION

PATENT NO. : 3,891,765
DATED : June 24, 1975
INVENTOR(S) : Paul Coirre et al.

It is certified that error appears in the above-identified patent and that said Letters Patent are hereby corrected as shown below:

Column 1, line 29, "; = OH," should read "; R = OH,".
Column 3, line 39, "half an hours" should read "half an hour".
Claim 3, lines 1-2, "of connective tissue" should read "of animal connective tissue".

Signed and Sealed this twenty-fourth Day of February 1976

[SEAL]

Attest:

RUTH C. MASON
*Attesting Officer*

C. MARSHALL DANN
*Commissioner of Patents and Trademarks*